United States Patent Office 3,825,506
Patented July 23, 1974

3,825,506
METHOD OF PREPARATION OF A POROUS THERMOSETTING RESIN
Edward W. Carter, Kennesaw, Ga., assignor to Glasrock Products, Inc., Atlanta, Ga.
Continuation-in-part of abandoned application Ser. No. 221,028, Jan. 26, 1972. This application Apr. 13, 1973, Ser. No. 350,960
Int. Cl. C08g 53/08
U.S. Cl. 260—2.5 L                                21 Claims

ABSTRACT OF THE DISCLOSURE

Porous open-cell thermosetting resin and process for preparing same. The process involves the initial formation of an emulsion having a liquid resin blend as the continuous phase and a hardener solution or dispersion as the discontinuous phase. The resin blend phase initially contains an amount of hardener less than that required for a stoichiometric cure of the resin. The hardener solution or dispersion initially contains an additional amount of hardener to supplement the blend and cure the resin. The liquid of the non-resin phase is selected to be substantially a non-solvent with respect to the resin. As the polymerization of the emulsion proceeds hardener is leached out of the solution phase which is the discontinuous phase, resulting in a phase inversion after partial gelation with the non-resin liquid solution phase becoming the continuous phase and the non-gelled resin blend becoming the discontinuous phase. After polymerization is completed and the resin solidified, the liquid of the non-resin phase is removed by extraction or evaporation. The result is a resin having a network of interconnected pores. An important aspect of the invention is that it permits control of the pore size of the product.

CROSS REFERENCE TO RELATED APPLICATION

This application is a continuation-in-part of copending application Ser. No. 221,028, filed Jan. 26, 1972, now abandoned.

BACKGROUND OF THE INVENTION

This invention is concerned with the manufacture of a porous, cellular polymeric structure. The prior art contains many references disclosing similar open-cell resinous products but none of these products is considered to be the equivalent of that of the present invention. The resinous product of the present invention has been found to possess a unique combination of the qualities of low density, porosity, and structural strength.

Several processes for the formation of porous polymeric material from an emulsion have been disclosed in the prior art. For example, U.S. Pats. 1,993,278, 1,933,290, 2,001,305, 2,112,529, and 2,302,833 disclose processes for the manufacture of rubber sponges from emulsions wherein the unvulcanized rubber latex forms the continuous phase and wherein droplets of water or other liquid insoluble in the rubber are dispersed therein as a discontinuous phase.

U.S. Pats. 2,085,052, 2,155,016 and 2,673,825 disclose processes for the manufacture of porous thermosetting materials which involve the formation of emulsion having resinous matrices with resin incompatible liquids dispersed therein.

U.S. Pats. 2,505,353, 2,673,825, 2,777,824 and 2,940,871 disclose similar processes applied to the manufacture of porous thermoplastic materials.

The Will reissue patent Re27,444, discloses a polyester emulsion wherein water forms the dispersed phase (see example 11 at column 14 of Will). The Will formulations employ microgels as emulsifiers to maintain the aqueous solution as the discontinuous phase completely through polymerization. The microgel particles become the interconnecting passages upon removal of the water. Since the microgel particles have extremely small diameter, the Will process is unsuitable for producing porous products having high flux capacities at low pressure differentials.

In all of the known prior art methods involving the gellation of a continuous phase of an emulsion, the polymer is completely gelled before removal of the discontinuous phase. None of the known prior art methods involves a phase inversion synchronized to occur after partial gelation. As a consequence, the known prior art methods require the cell walls to be ruptured after complete gellation to form the porous product. Inherent in such rupturing is a general weakening of the polymeric structure. This latter defect is minimized in the present invention.

SUMMARY

In accordance with the present invention an emulsion is prepared which insures that a phase inversion will occur after partial gelation. The synchronization and timing of the phase inversion is crucial to the formation of a suitable porous resin product having a network of interconnected pores. This is accomplished by preparing a two-phase liquid emulsion having (1) a continuous liquid resin blend phase containing the resin and a less than stoichiometric amount of hardener for the resin and (2) a discontinuous non-resin liquid solution phase containing an additional amount of hardener. All of the reactants utilized in the present process form forming a porous resin are reactants from which similar resin products have been previously prepared. The present process, however, includes the formation of a two phase liquid emulsion and synchronizing a phase inversion to occur after partial gelation of the resin.

Accordingly, it is an object of the present invention to provide a process for producing a high-strength thermosetting resin material having an interconnecting network of pores of predetermined size and volume.

It is a further object of the present invention to provide a process which involves an emulsion as a starting material in which a phase inversion occurs after partial gelation.

It is yet another object of the present invention to provide a process for producing a resin wherein the resin before hardening has occluded therein an incompatible discontinuous liquid phase which is capable of being extracted after gelation of the resin.

It is a further object of the present invention to provide a process whereby a stable thermosetting resin having a plurality of interconnecting pores is produced by the step of removing an incompatible liquid from the resin.

It is another object of the invention to provide an improved resin having a multiplicity of interconnecting pores.

It is yet another object of the invention to provide a resin which is lighter than similar known prior art resins, yet with a structural strength which is not significantly less, if not equal to that of such known resins.

DESCRIPTION OF THE PREFERRED EMBODIMENTS

Figure 2:
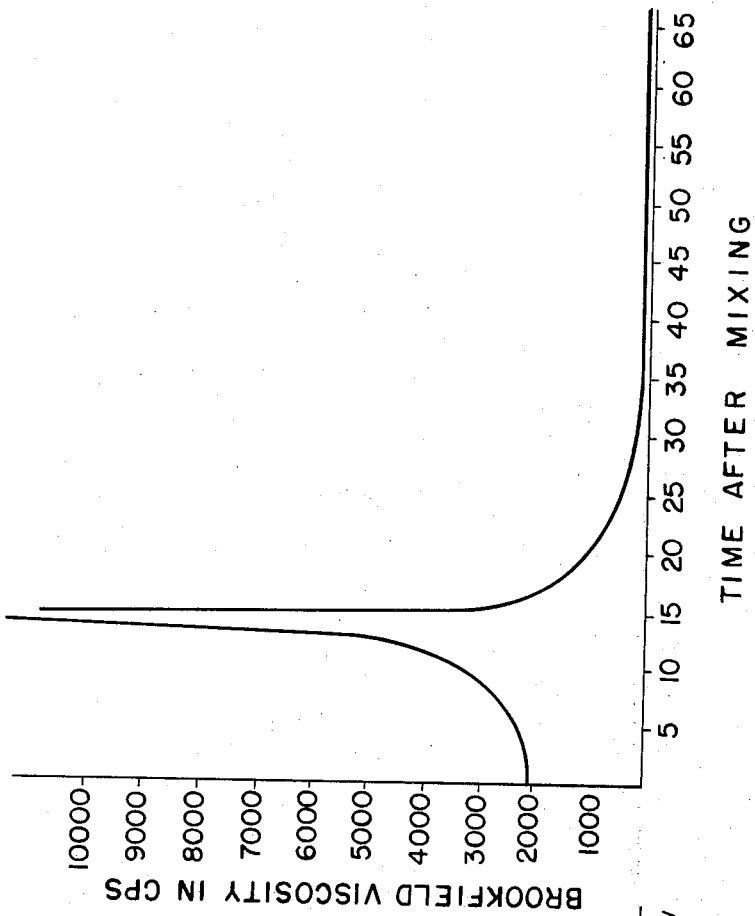
FIG. 2 is a graph showing the viscosity (vertical axis) at various points in time after mixing (horizontal axis) for the emulsion of example 38.

At the outset the process of the present invention is described in its broadest aspects where a porous thermosetting plastic is prepared from a liquid polymerizable resin and resin hardener capable of cross-linking the resin. All of the reactants utilized in the present process for forming a porous resin are reactants from which resins have been prepared previously.

The emulsion of this invention is formed by mixing two separately prepared phase mediums. One is a blend of a hardener and a resin and is prepared by adding a less than stoichiometric amount of the hardener to a liquid thermosetting resin to form what is referred to herein as a resin blend or simply blend. The second is a solution formed by dissolving or dispersing an additional amount of hardener for the resin in a liquid medium that is incompatible with the resin, i.e. insoluble in the liquid resin. The two phase mediums are then mixed to form an emulsion. Depending on the nature of the liquids involved, it may be necessary to add an emulsifier, surfactant or protective colloid to the mixture in order to form a stable emulsion. In other cases the addition of an emulsifying agent is merely optional.

When the two mediums are mixed a curing reaction starts wherein hardener is leached out of the non-resin discontinuous phase. The transfer of the hardener from the discontinuous non-resin phase into the continuous resin blend phase causes the emulsion to become unstable, resulting in a phase inversion. If the amount of hardener initially present in the non-resin phase was properly selected, the inversion will occur after partial gellation to give the desired product. However, if too much hardener is initially present in the non-resinous phase, an inversion does not occur and a network of interconnected pores does not result.

Initially, the emulsion contains two liquid phases, a continuous liquid resin phase and a discontinuous non-resin liquid phase. In the phase inversion that portion of the liquid resin which has not yet gelled ceases to be the continuous phase and becomes a discontinuous phase dispersed in the non-solvent liquid. Immediately after the phase inversion three phases are present: a gelled continuous resin phase, a non-solvent liquid continuous phase, and a liquid resin discontinuous phase. In order for this inversion to result in a porous structure, the polymer phase must have increased in viscosity so that it is a stable gel at the time of inversion. This is accomplished by controlling the initial concentration of stabilizing monomer in the aqueous phase and the reactivity of the monomer resin phase and hence the degree of cure at the time of inversion.

If a shaped product is to be formed by casting, the emulsion must be placed in a form or mold prior to the phase inversion. The time at which the inversion occurs is important because successful casts using the material are not possible beyond the point in time where the inversion starts. Casting disturbs the gel structure and weakens it or creates flaws which are detectable in the cured material. Pore diameter anisotropy may be achieved by varying the surface preparation of the substrate against which the pore forming material is cast. By this procedure the entrance pores can be made larger or smaller in diameter than the interior pores. Bubble point tests have measured maximum surface openings in the 3–6 micron range for a material having a 30–40 micron interior pore. Microscopic measurements have confirmed other cases in which 90 and 100 micron pore diameters predominate at the surface of a 30–40 micron interior pore formulation.

FIG. 2 shows a typical gel curve. FIG. 2 shows that the viscosity of the emulsion increases up to that point in time where the phase inversion starts, which point is represented by a discontinuity or break in the curve. After commencement of the phase inversion, the viscosity decreases until the phase inversion is complete. The gel and inversion curves are controlled by the resin reactivity, the formulation of the resin and non-resin phases, and the stoichiometry leading to complete cure. A shift in the inversion point affects average pore diameter and the slope of the inversion curve affects the pore size distribution.

The following operative steps summarize the present invention in its broadest aspects:

1. A non-stoichiometric blend of liquid resin and hardener is prepared by mixing resin and a first amount of hardener to form a homogeneous blend. The first amount of hardener is less than the stoichiometric amount required to react with and cure the resin.

2. A solution or suspension of a second amount of hardener in a suitable non-resin liquid solvent or carrier is prepared. The liquid solvent or carrier for the hardener is selected so as to be incompatible, i.e. insoluble, with the resin blend. The first and second amounts of hardener are apportioned between the liquid resin and the second liquid to produce a phase inversion after partial gelation.

3. The resin blend and the hardener suspension solution are combined. After the resin blend and hardener solution are combined, the two phases are peptized resulting in a dispersion mixture or emulsion with the resin and hardener blend as the continuous phase and the non-resin liquid and hardener solution or dispersion as the discontinuous phase.

After performing the foregoing manipulative step the resin in the blend leaches additional hardener from the discontinuous hardener solution phase and thereafter forms a gel. A phase inversion occurs after partial gelation.

In addition to the operative steps outlined above, the following optional steps may be included.

4. The liquid phase may be removed after the phase inversion. The result is a solid resin having a multiplicity of interconnected pores. The liquid phases may be removed at any time after the inversion by any suitable means such as by extraction, evaporation, draining, or by application of compressed air or other gas.

5. Heating the emulsion. The gel and inversion of the two phase system may be obtained at any temperature below the boiling temperature of the non-resin solution phase. However, the higher the temperature, the more rapid the gel is obtained. An increase in pore size is generally observed as the reaction temperature is raised.

6. Postcuring the gel at an elevated temperature. The desirability of the postcuring step depends on the type of hardener used and on the end use temperature of the porous product. The postcuring step may be performed either before or after removal of the liquid used as the solvent or carrier in the solution phase. The postcure should have no effect on pore size; however, a smaller effective pore size results from completing the postcuring step prior to removal of the liquid phases. This effect is thought to occur by additional resin leaving the dispersed liquid phase and grafting onto the previously gelled cell wall matrix to form appendant structures thus reducing the effective pore size.

In accordance with the present invention the amount of hardener in the initial non-resin solution phase is determined empirically in order to assure a complete cure of the resin after inversion and to control pore sze. The amount in the non-resin phase may vary between 5% by weight and 100% of the total stoichiometric amount. The pore size of the final product is increased by increasing the amount of hardener in the non-resin solution phase. The amount of hardener initially present in the resin phase is preferably the balance of the stoichiometric amount.

If the total amount of hardener, initially present in both phases, it greater than stoichiometric, the result may be a product that is an unstable gel, a non-porous structure, a thermoplastic, or an adduct solution or dispersion. Phase separation is also a possibility where the total amount of hardener used is greater than stoichiometric. Any product obtained in this manner will be a weaker structure and will generally have inferior physical properties.

If the total amount of hardener, initially present in both phases, is less than stoichiometric, any products will, at best, be inferior with respect to mechanical and physical properties. In this case, the resin may completely fail to harden. Another possible result is a non-porous product.

The solvent phase must be 60.6% or less of the total volume in order to form the required type of initial dispersion. The initial solvent-hardener solution is prepared so that the hardener is 30% to 70% by weight.

The resins which may be used in the present invention include epoxies, phenolics, aminoplasts, polyurethanes, alkyds, silicones and other thermosetting resins.

The epoxide resins useful in this invention are epoxide resins which contain more than one 1,2-epoxide group per molecule and no other groups reactive with amines and sulfonamide groups. They can be saturated or unsaturated aliphatic, cycloaliphatic, aromatic or heterocyclic and can be monomeric or polymeric in nature.

Useful epoxide resins include glycidyl ethers of polyhydric phenols obtained by reacting a polyhydric phenol in an excess of epichlorohydrin with sodium hydroxide. Such polyhydric phenols include bisphenol A (p,p'-dihydroxydiphenyl propane), resorcinol, hydroquinone, 4,4'-dihydroxybenzophenone, bis(4-hydroxyphenyl) ethane, 1,5-dihydroxynaphthalene, 4,4'-dihydroxybiphenyl, and novolak resins containing more than two phenol moieties linked through methylene bridges.

Other glycidyl ethers of polyhydric phenols are polymers prepared by reacting 1.1 up to about 2 mols of epichlorohydrin with 1 mol of dihydric phenol or by reacting diepoxides with added dihydric phenols.

Additional epoxide resins are glycidyl ethers of polyhydric alcohols made by reacting a polyhydric alcohol and epichlorohydrin with an acidic catalyst such as boron trifluoride and subsequently treating the resulting product with an alkaline dehydrohalogenating agent. Included among the polyhydric alcohols that can be used in the preparation of these polyepoxides are glycerine, ethylene glycol, propylene glycol, diethylene glycol, hexanetriol, pentaerythritol, trimethylol ethane and trimethylol propane.

Still other epoxide resins include glycidyl esters of polycarboxylic acids, such acids being azelaic acid, adipic acid, isophthalic acid, terephthalic acid, dimerized and trimerized unsaturated fatty acids, etc.

The epoxide resins also include epoxidized hydrocarbons such as vinyl cyclohexene dioxide, butadiene dioxide, dicyclopentadiene dioxide, epoxidized polybutadiene and limonene dioxide. Other epoxide resins are epoxidized esters, for example, epoxidized soybean oil, epoxidized glycerol trilinoleate, and 3,4-epoxy-cyclohexylmethyl-3,4-epoxycyclohexane carboxylate. Still other epoxides are polymers and copolymers of vinyl polymerizable monoepoxides, such monoepoxides being allyl glycidyl ether, glycidyl acrylate and glycidyl methacrylate.

The preferred epoxide resins are the glycidyl polyethers of polyhydric phenols and polyhydric alcohols, particularly the glycidyl polyether of p,p'-dihydroxydiphenyl propane or bisphenol A as it is commonly named.

The term "phenolic" is understood to include phenol-formaldehyde resins, cresol-formaldehyde resins, phenol-furfural resins, cresol-furfural resins and, in general, most or all of the resins of this class. The "aminoplasts" which may be used include the usual members of the group of aminoplasts such as urea-aldehyde resins, thiourea-aldehyde resins, melamine-aldehyde resins and the like. In general, aldehydes other than formaldehyde may be employed in lieu of formaldehyde, e.g. acetaldehyde, propionaldehyde, butyraldehyde, crotonaldehyde, etc.

The "alkyds" useful in connection with this invention are polyesters formed by reacting a polybasic acid with a polyhydro alcohol. They may be modified by incorporating a monobasic fatty acid into the reactants. These resins are generally described in the *Encyclopedia of Polymer Science*, Volume 1, pp. 663–734 (Interscience Publishers, 1964).

Conventional hardening or curing agents are used. For example, if an epoxy resin is used, the hardener may be a primary, secondary or tertiary amine; a Bronsted acid or anhydride; an alkali hydroxide or phenoxide; a carboxylic acid or anhydride. Other suitable hardeners for epoxy resins are listed in U.S. Pat. 2,528,932 and in the *Encyclopedia of Polymer Science*, Volume 6, pp. 222–235.

Merely by way of example the following resin hardener, and solvent combinations can be advantageously utilized in accordance with the present invention:

TABLE 1

| Resin | Hardener | Non-resin liquid |
| --- | --- | --- |
| Epoxies | Amines etc | $H_2O$ or alcohol.[1] |
| Phenolic novalac | Hexamethylenetetramine; formaldehyde; paraformaldehyde. | $H_2O$. |
| Polyester alkyd/styrene | Peroxide | $H_2O$ |
| Isocyanate | Polyol | $H_2O$ |

[1] The alcohol and epoxy systems work only to the extent that alcohol is partially insoluble in epoxy. Only the insoluble fraction of the alcohol in the formulation contributes to pore volume. Heat increases the solubility of alcohol in epoxy and correspondingly reduces the pore volume. The dissolved alcohol also decreases the strength of the resin because of a plasticizing effect.

Other monomers may be added to the liquid resin blend so long as they do not destroy the essential thermosetting characteristics of that resin. Suitable monomers which may be added to the resin blend include, for example, styrene, acrylonitrile, vinyltoluene, etc. These and other suitable monomer modifiers are enumerated in U.S. Pat. No. 3,655,591 issued to Jerome A. Seiner, Apr. 11, 1972, the teachings of which are hereby incorporated by reference. The preferred monomeric modifier is styrene. Likewise, various elastomers such as butadiene-acrylonitrile copolymers, butadiene-styrene copolymers, etc. may be added to the resin blend so long as the essential thermosetting characteristics thereof are not destroyed. The preferred elastomeric modifier is Hycar CTBN, a carboxy-terminated acrylonitrile-butadiene copolymer marketed by the B. F. Goodrich Chemical Co., Inc.

Optionally, a different hardener may be used in the resin blend than that used in the hardener solution or dispersion.

Optionally, a catalyst may be added to the emulsion to accelerate the curing reaction, for example, DMP–30 (Rohm & Haas) has been found effective. The result of the addition of such a catalyst is an accelerated reaction and a product of larger pore size.

Cross-linking agents such as various anhydrides and amines may also be added to the resin.

The liquid which initially forms the discontinuous phase serves as a solvent or dispersion medium for the hardener. Liquids which may be suitably used to form the initial discontinuous phase include water, ethers, alcohols, toluene, and other substituted aromatics, polyethers, fluorocarbons and other liquids selected on the basis of polarity and incompatibility with the polymerizing resins. The non-resin liquid medium that initially forms the discontinuous phase of the emulsion must be substantially a non-solvent with respect to the resin. Another requirement, for the selection is that the liquid of the non-resin phase be capable of being extracted from the resin after the resin has hardened. Otherwise, a porous structure permeable to air or liquid is not possible and a non-porous two phase material would result.

The pore size for the products of this invention is dependent on the amount of hardener initially present in the non-resin phase, on the cure temperature, and on other factors influencing the cure rate such as the presence of catalysts, etc. Tables 2, 3, and 4, below, illustrate the effect on pore size due to variances in these parameters.

TABLE 2

Factorial dependence of pore diameter for an epoxy water system formulation

Variables:

| | | | | | | |
|---|---|---|---|---|---|---|
| Pore volume fraction | .3 | .4 | .6 | .4 | .3 | .3 |
| Hardener solution concentration, percent | 10 | 10 | 10 | 10 | 5 | 2.5 |
| Cure temperature, °F | 75 | 75 | 75 | 140 | 75 | 75 |
| Pore diameter (microns) | 55 | 73 | 7.4 | 8.5 | 64 | 30 |

TABLE 3

Factorial dependence of pore diameter for a polyester water system formulation

Variables:

| | | | | |
|---|---|---|---|---|
| Pore volume fraction | .3 | .4 | .5 | .4 |
| Cure temperature, °F | 75 | 75 | 75 | 140 |
| Pore diameter (microns) | .2 | .7 | (*) | (*) |

*Porosity discontinuous.

TABLE 4

Factorial dependence of pore diameter for an epoxy alcohol system formulation

Variables:

| | | | | | |
|---|---|---|---|---|---|
| Pore volume fraction | .04 | .10 | .26 | .36 | 0 |
| Isopropanol fraction | .3 | .4 | | | .4 |
| Methanol fraction | | | .3 | .4 | |
| Cure temperature, °F | 75 | 75 | 75 | 75 | 140 |
| Pore diameter (microns) | 35 | 35 | .5 | .7 | |

Reinforcing fillers may be effectively used in producing the porous structures if they are incorporated in the step 1 composition. Flow control additives and thixotropes are also more effective if included in the liquid resin. They may also be incorporated after formation of the emulsion.

Reinforcement fillers and flow control additives or particulate or fibrous materials such as cellulated glass, dense glass particles, silica, asbestos, powdered polymers and other solids of varying size ranging from ¼ inch to submicron sized colloids may be added to the emulsion prior to gellation.

Protective colloids, surfactants, and emulsifiers (peptizers) are selected on the basis of their ability to produce a stable two phase emulsion. Amides, amines, carboxylic acids, polar and non-polars surfactants and colloid sized particles have been found effective for this purpose.

The resin products of this invention have been formed into tubes and sheets which are suitable for use in filtration systems and as membrane supports in reverse osmosis systems. Microporous as well as porous products have been prepared.

The products of this invention have also been incorporated into laminates with glass fabrics or mats and formed into porous tools for vacuum molding and vacuum forming.

When cellulated or hollow fillers are incorporated into the resinous materials of this invention the resulting product is a structural foam of a very high strength to weight ratio. These materials are important in aircraft and missile applications, deep submergence vessels, as flotation materials in commercial structures, as thermal insulation in a variety of constructed items ranging from refrigerators and houses to storage tanks for hot and cold materials. Lightweight structural panels and other goods may be manufactured using this material as a core in sandwich structures, or in wound or wrapped composite structures.

The following general examples describe variations in the general procedure to be followed in order to accomplish the objects of the present invention:

Example 1

1. A non-stoichiometric blend of liquid resin and hardener is prepared by mixing resin and hardener to form a homogeneous blend. An excess amount of resin over the stoichiometric amount required to complete polymerization is maintained in the blend.

2. A solution or dispersion of additional hardener and a suitable non-resin liquid solvent or carrier is prepared by adding an amount of hardener sufficient to supplement the amount of hardener in the resin blend and yield the total stoichiometric amount of hardener required for the complete curing of the resin when the resin blend and hardener solution are combined. The liquid solvent for the hardener is selected so as to be incompatible with the resin blend.

3. The resin blend and the hardener dispersion or solution are combined. Because the resin blend and hardener solution are incompatible, a phase separation results. After the resin blend and hardener solution are combined, the two phases are peptized resulting in a dispersion mixture or emulsion with the resin and hardener blend as the continuous phase and the non-resin liquid solvent and hardener as the discontinuous phase.

After performing the foregoing manipulative step the resin in the blend leaches additional hardener from the discontinuous phase and thereafter forms a gel. As the leaching of hardener continues, the dispersion becomes unstable so that a phase inversion occurs at some time between the resin gel and the resin cure. The result of the inversion is that the ungelled resin becomes the discontinuous phase.

The curing thereafter continues beyond the gellation state and the resin approaches a stoichiometric cure with appended structures being formed on the gelled polymer structure as resin leaves the liquid phase and adheres onto resin in the solid phase.

4. The liquid solution phase is then extracted after the stoichiometric cure is completed.

The result of the foregoing is a solid resin having a multiplicity of small pores.

Example 2

1. A non-stoichiometric blend of liquid resin and hardener is prepared by mixing resin and hardener to form a homogeneous blend. An excess amount of resin over the stoichiometric amount required to complete a cure is maintained in the resin blend.

2. A solution or dispersion of additional hardener and a suitable non-resin liquid solvent or carrier is prepared by adding an amount of hardener sufficient to supplement the amount of hardener in the resin blend and yield the total stoichiometric amount of hardener required for the complete reaction of the resin in the blend when the resin blend and hardener solution are combined. The non-resin liquid solvent or carrier is selected so as to be incompatible with the liquid resin in the blend.

3. The resin blend and the hardener solution are combined. Because the blend and solution are incompatible, two separate phases form. After the resin blend and hardener solution are combined, the two phases are peptized resulting in a dispersion mixture or emulsion with the resin and hardener blend as the continuous phase and the non-resin solvent and hardener as the discontinuous phase.

After performing the foregoing manipulative step the resin leaches additional hardener from the discontinuous phase and thereafter forms a gel.

The curing thereafter continues beyond the gellation state and the resin approaches a stoichiometric cure with appended structures being formed on the gelled polymer structure as resin leaves the liquid phase and adheres onto resin in the solid phase. The curing reaction during this step is accelerated by postcuring the structure at an elevated temperature.

4. The liquid phases are then extracted after a stoichiometric reaction is completed.

The result of the foregoing is a solid resin having a multiplicity of small pores.

Example 3

1. A non-stoichiometric blend of liquid resin and hardener is prepared by mixing resin and hardener to form a homogeneous blend. An excess amount of resin over the stoichiometric amount required to complete polymerization is maintained in the resin blend.

2. A solution or dispersion of additional hardener and a suitable non-resin liquid solvent is prepared by adding an amount of hardener sufficient to supplement the amount of hardener in the resin blend and yield the total stoichiometric amount of hardener required for the complete curing of the resin when the resin blend and hardener solution are combined. The non-resin liquid solvent is selected so as to be incompatible with the blend.

3. The resin blend and the liquid solution are combined. Because the resin blend and the hardener solution are incompatible an emulsion results. After the resin blend and hardener solution are combined, the two phases are peptized resulting in a dispersion mixture or emulsion with the resin and hardener blend as the continuous phase and the non-resin liquid solvent and hardener as the discontinuous phase.

After performing the foregoing manipulative step the resin leaches additional hardener from the discontinuous phase and thereafter forms a gel.

The curing thereafter continues beyond the gellation state and the resin approaches a stoichiometric cure with appended structures being formed on the gelled polymer structure as resin leaves the liquid phase and adheres onto resin in the solid phase.

4. Before the cure is complete, the liquid phases are extracted.

5. A postcure is performed after extraction.

The result of the foregoing is a solid resin having a multiplicity of small pores with a reinforcing effect obtained by postcuring.

Example 4

1. A non-stoichiometric blend of liquid resin and hardener is prepared by mixing resin and hardener to form a homogeneous blend. An excess amount of resin over the stoichiometric amount required to complete a cure is maintained in the resin blend.

2. A solution or dispersion of additional hardener and a suitable non-resin liquid solvent is prepared by adding an amount of hardener sufficient to supplement the amount of hardener in the resin blend and yield the total stoichiometric amount of hardener required for the complete curing reaction of the resin in the blend when the resin blend and hardener solution are combined. The non-resin liquid solvent is selected so as to be incompatible with the resin.

3. The resin blend and the hardener solution are combined. Because the resin blend and hardener solution are incompatible a phase separation results. After the resin blend and hardener solution are combined, the two phases are peptized.

After the blend of resin and hardener from step 1 and the solution of hardener of step 2 are combined, reinforcing fillers are included in the mixture.

The result is a dispersion mixture of emulsion with the resin and hardener blend as the continuous phase the non-resin liquid and hardener as the discontinuous phase.

After performing the foregoing manipulative step the resin leaches additional harener from the discontinuous phase and thereafter forms a gel.

The curing thereafter continues beyond the gellation state and the resin approaches a stoichiometric cure with appended structures being formed on the gelled polymer structure as resin leaves the liquid phase and adheres onto resin in the solid phase.

4. The liquid is then extracted after a stoichiometric reaction is completed.

The result of the foregoing is a solid resin having a multiplicity of small pores.

Example 5

1. A non-stoichiometric blend of liquid resin and hardener is prepared by mixing resin and hardener to form a homogeneous blend. An excess amount of resin over the stoichiometric amount required to complete a cure is maintained in the resin blend. Reinforcing fillers are then added to the resin blend.

2. A solution or dispersion of additional hardener and a suitable non-resin liquid solvent is prepared by adding an amount of hardener sufficient to supplement the amount of hardener in the resin blend and yield the total stoichiometric amount of hardener required for the complete reaction of the resin when the resin blend and the hardener solution are combined. The non-resin liquid solvent is selected so as to be incompatible with the blend.

3. The resin blend and the hardener solution are combined. Because the resin blend and hardener solution are incompatible a phase separation results. After the resin blend and hardener solution are combined, the two phases are peptized resulting in a dispersion mixture or emulsion with the resin and hardener blend as the continuous phase and the non-resin liquid solvent and hardener as the discontinuous phase.

After performing the foregoing manipulative step the resin in the blend leaches additional hardener from the discontinuous phase and thereafter forms a gel.

The curing thereafter continues beyond the gellation state and the resin approaches a stoichiometric cure with appended structures being formed on the gelled polymer structure as resin leaves the liquid phase and adheres onto resin in the solid phase.

4. The liquids are then extracted after a stoichiometric reaction is completed.

The result of the foregoing is a solid resin having a multiplicity of small pores.

In accordance with the present invention the following specific examples were prepared.

Example 6—Epoxy Resin System

A first solution containing a non-stoichiometric blend of an epoxy resin and epoxy resin hardener was prepared as follows: A solid aniline amine adduct having an active hydrogen equivalent weight of 55.6, Epotuf[1] hardener 37–623, was dissolved in methylene chloride solvent to make a 48.3% solution of the hardener. This hardener solution was then mixed with Epotuf[1] 37–140, a bisphenol acetone epoxy aduct having an apoxide equivalent weight of 180–195, to give an epoxy percentage of 72.1.

An amine water solution was then prepared. A reactive polyamide hardener, Epotuf[1] 37–640, amine value of 370–410, was dissolved in water to make a 13 percent solution. This concentration was calculated to complete the epoxy cure when 53.3 parts of amine solution were combined with 46.7 parts of epoxy solution on a weight basis.

The two solutions were then combined in the above proportions. The mixture was well stirred at room temperature using a hand held spatula to produce a dispersion of the water amine solution in the epoxy resin solution. As the amine was leached from the water phase the epoxy resin phase gelled.

After a gel formed, the mixture was postcured at a temperature below the boiling point of the water solution. This postcuring temperature was initially approximately 170° F. but increased to approximately 300° F. In addition to evaporating the water, the postcuring also served to complete the amine-epoxy reaction within the gelled or solid phase. The product had a pore volume of approximately 45% and an average pore size of three to nine microns.

Example 7—Phenolic Resin

A solution of novalak resin in alcohol Foundrez[1] 23–703 and hexamethylene tetramine was prepared by dissolving 8% hexamethylene tetramine in the novalak resin solution. A solution of 7% hexamethylene tetramine in water was prepared separately. These two solutions were combined using a Waring Blender so that the water formed ---
[1] Trade names of Reichhold Chemicals, Inc.

a suspension in the phenolic resin. This suspension was heated for four hours at 150° F. and then postcured 2 hours at 300° F. The product obtained had a pore volume of 35% and an average pore size of 17 microns.

Example 8—Epoxy-Phenolic Resin

A solution containing 7 parts hexamethylene tetramine, 50 parts Epotuf [1] 37–140, and 50 parts Foundrez [1] was prepared. A second solution containing 13% Epotuf [1] hardener 37–640 in water was prepared. These solutions were combined in equal parts and mixed using a Waring Blender to form an emulsion. The emulsion was heated for four hours at 150° F. to form a gel and then postcured for two hours at 250° F. The resulting composition had a pore volume of 45% and a pore size of 11 microns.

Example 9—Urethane Resin 15.4 parts by weight of polyphenyl isocyanate resin PAPI [2] were mixed with 9.6 parts of glycerine. A second solution containing 9.6 parts of glycerine and 15.4 parts water was prepared. The two solutions were then mixed to form an emulsion. The emulsion of water solution in resin was cured four hours at 150° F. followed by two hours at 250° F. The resulting product had a pore volume of 40 percent and a pore size of 6 microns.

Example 10—Polyester Resin

A solution containing 0.5% cobalt naphthenate, 49.25% styrene, and 49.25% polyester alkyd resin Dion-Iso [3] 6425 was prepared. A dispersion containing 2% methyl ethyl ketone peroxide in water was then prepared. This dispersion was hand mixed until stable. Equal parts of solution and dispersion were combined. The resulting suspension of water phase in styrene and polyester solution was cured two hours at 150° F. followed by ten hours at 250° F. The resulting material had a pore volume of 41% and a pore size of 0.2 micron.

Examples 11 and 12—Epoxy Non-Aqueous System

Water has been used in all the previous examples as the solvent for the second phase. Other solvents, which are incompatible with the liquid resin being polymerized, could be substituted for water to obtain a porous, interconnected structure. To illustrate this, the first example was repeated using isopropyl alcohol and propanol as solvents in the second phase in place of water. Identical materials and quantities were used; mixing sequences were also the same.

After gelling these compositions for two hours at 140° F., the mixtures were postcured for four hours at 250° F. in order to complete the epoxy resin polymerization and to evaporate the alcohol which had formed a second continuous phase. The substitution of propanol for water resulted in a pore size of 15 microns and a pore volume of 38%. The substitution of isopropyl alcohol for water resulted in a pore size of 27 microns and a pore volume of 39%.

Examples 13–18—Effect of Varying the Epoxy Resin Hardener Concentration in the Solvent Phase A series of experiments were performed to show the effect of hardener concentration in the solvent phase on the porosity of the resulting material. For these experiments, Epotuf [1] 37–140 was used as the epoxy resin, and Epotuf [1] 37–612 (amine value 330–350) was used as the epoxy resin hardener. A ratio of 60 parts by weight of hardener to 100 parts by weight of epoxy resin for these components imparts near optimum mechanical properties to the cured plastic. This ratio of hardener and epoxy resin was considered to be the stoichiometric quantity, and was used throughout this series of experiments. Water was used as the medium in the non-resin phase. In theory the non-resin phase must be 60.6% or less of the total volume in order to form a dispersion wherein the resin is the continuous phase. The concentrations of the three constituents in these experiments were (1) 37–140 (34.4%), (2) 37–612 (20.6%), and (3) $H_2O$ (45%). This composition was constant for the six experiments. The percentage of the stoichiometric amount of hardener (60.0 phr.; phr. is parts per hundred parts resin) which was apportioned to the solvent phase was the variable in this series of experiments. The results of these experiments are shown in the following table.

TABLE 5

| | Levels of hardener in the solvent phase (percent of stoichiometry), percent | Solvent phase (amine hardener/$H_2O$ ratio) | Resin phase (epoxy resin/hardener ratio) |
|---|---|---|---|
| 13 | 100 | 20.6/45 | 34.4/0 |
| 14 | 50 | 10.4/45 | 34.4/10.3 |
| 15 | 25 | 5.1/45 | 34.4/15.4 |
| 16 | 12.5 | 2.6/45 | 34.4/18.0 |
| 17 | 6.3 | 1.3/45 | 34.4/19.3 |
| 18 | 0 | 0/45 | 34.4/20.6 |

These compositions were all cured under closely similar conditions. After combining the resin phase and solvent phase and mixing well, the compositions were gelled for two hours at 170° F. and postcured for two hours at 240° F. Fifty gram sized batches were prepared.

The results of these experiments were open-celled products having the following characteristics:

TABLE 6

| | Level of hardener in solvent phase, percent | Pore size, microns | Pore volume, percent |
|---|---|---|---|
| 13 | 100 | 24 | 53.0 |
| 14 | 50 | 18 | 55.2 |
| 15 | 25 | 19 | 44.4 |
| 16 | 12.5 | 34 | 47.6 |
| 17 | 6.3 | 30 | 52.5 |
| 18 | 0 | 28 | 24.8 |

In example (13), unlike the other experiments, the emulsion initially formed with the resin as the discontinuous phase. In this experiment epoxy resin leached into the continuous phase until a gel formed. The product of this experiment exhibited a slight amount of shrinkage, indicating that the initial gel structure was dimensionally unstable.

Specimens (14), (15), (16) and (17) represent the preferred ranges for practicing this invention. In those cases, the products were well cured and shrinkage, as evidenced by the large pore volumes, was minimal. In each of these cases there occurred an inversion prior to the resin cure whereby the solvent became the "new continuous phase" with the ungelled resin dispersed therein.

Example 18 shows that an inversion of the dispersed phases will occur for some polymer resin systems without leaching hardener from the dispersed phase; however, the product of this experiment was inferior due to the relatively small pore volume. Apparently the inversion which produced a network of interconnected pores is a physical effect which results from a depletion of suspending media as a result of polymer gel formation. Inversion probably coincides with 60.6 percent volume fraction which is the theoretical limit on the volume of the suspended phase. As a polymerization proceeds, gelled polymer ceases to behave like a suspending liquid, and is subtracted from the total volume of the phases in determining relative phase concentrations.

This series of experiments proved that the amount of hardener initially present in the non-resin phase is critical to obtaining a desirable product.

Examples 19–26—Effect of Varying the Epoxy Resin Hardener Concentration in the Solvent Phase Another series of experiments was conducted in which two hardeners were used, Epotuf [1] 37–612 of examples ---
[2] Trade name of Carwin Chemical Company.
[3] Trade name of Diamond Shamrock Chemical Company.

(7)-(12) and Epotuf[1] 37-619, a heat curing aniline derivative. Stoichiometric calculations were made to insure a complete cure of the resin. The equation for this calculation is given as:

$$100 = X(37)-140) + A(37-612) + B(37-619) + C(DMP30) + .5(TiO_2) + 45(H_2O)$$

$$X(37-140) = \frac{A}{.6} + \frac{190}{55.6}B$$

Wherein:
X is resin (parts by weight)
A is parts by weight of Epotuf 37-612 hardener
B is parts by weight of Epotuf 37-619 hardener
C is parts by weight DMP-30[R] the trade name for 2,4,6-tris (dimethylaminomethyl) phenol marketed by Rohm and Haas
$TiO_2$ is titanium dioxide white pigment

TABLE 7

| | Solvent phase | | Resin phase | | | | |
|---|---|---|---|---|---|---|---|
| Experiment # | H₂O | 37-612 hardener | 37-612 hardener | 37-140 resin | 37-619 hardener | TiO₂ | DMP30 catalyst |
| 19 * | 45 | 5 | 0 | 41.2 | 8.3 | .5 | 0 |
| 20 * ** | 45 | 5 | 0 | 41.2 | 8.3 | .5 | 1.2 |
| 21 * | 45 | 5 | 0 | 41.2 | 8.3 | .5 | 0 |
| 22 * ** | 45 | 5 | 0 | 39.5 | 8.0 | .5 | 2.0 |
| 23 * ** | 45 | 0 | 4.8 | 39.7 | 8.0 | .5 | 2.0 |
| 24 * | 45 | 8 | 0 | 39.8 | 6.7 | .5 | 0 |
| 25 | 45 | 11.8 | 0 | 38.2 | 4.7 | .3 | 0 |
| 26 * *** | 45 | 5 | 0 | 37.8 | 7.7 | .5 | 4.0 |

*Dispersion inverted before polymer gelled.
**Loosely bonded gel structure—material too weak to be useful.
***Solid liquid phase separation—solid phase non-porous.

The results of these experiments show that, except for experiment (25), there was not enough 37-612 to gel the resin at room temperature. As a result, when the 37-612 which stabilized the dispersion was spent, the resin had not gelled and the dispersion either broke into layers or inverted to give a loosely bonded suspension of particles. In these experiments, a minimum amount of hardener in the solvent phase was found to lie between 8 and 11.8 percent. The DMP-30[6] was included as a formulation variable because it is a catalyst which causes the aniline to react with epoxy resin at room temperature. Variations in the amounts of catalyst used did not noticeably affect the resulting products.

The following table shown the degree of porosity obtained in these experiments:

TABLE 8

| Experiment # | Pore size, microns | Pore volume, percent |
|---|---|---|
| 19 | 18 | 3.8 |
| 20 | | |
| 21 | 23 | 11.2 |
| 22 | | |
| 23 | | |
| 24 | 18 | 6.1 |
| 25 | 32 | 41.0 |
| 26 | | |

EXAMPLES 27-30—EFFECT OF VARYING THE AMOUNT OF POLYMER RESIN INITIATOR IN THE SOLVENT PHASE

A series of experiments similar to (13-17) and (19-26) was performed to show that a minimum concentration of initiator in the solvent phase is required to prepare a useful porous structure using a polyester resin system. The alkyd resin employed in this series of experiments was Dion-Iso 6425.[3] The hardener used was methyl ethyl ketone peroxide (MEK·OOH).

[3] Trade name of Diamond Shamrock Chemical Co.

TABLE 9
Experimental design

| | Solvent phase | | Resin phase | | |
|---|---|---|---|---|---|
| Experiment # | H₂O | MEK.OOH | 30% alkyd | MEK.OOH | H₂O |
| 27 | 45 | 3 | 52 | 0 | 0 |
| 28 | 45 | 1.5 | 52 | 1.5 | 0 |
| 29 | 45 | 0 | 52 | 3 | 0 |
| 30 | 0 | 3 | 52 | 0 | 45 |

The products of experiments 28, 29 and 30 exhibited varying amounts of shrinkage indicating dimensional unstability. The products possessed the following characteristics:

TABLE 10

| Experiment # | Pore size, microns | Pore volume, percent |
|---|---|---|
| 27 | 13 | 44.2 |
| 28 | 18 | 44.2 |
| 29 | 1.2 | 3.0 |
| 30 | 3.0 | 3.1 |

WORKING EXAMPLES 31-34—EFFECT OF VARYING THE AMOUNT OF HARDENER IN THE SOLVENT PHASE

This series of experiments was similar to that of examples (19)-(26). It substituted Epotuf[1] 37-640 for Epotuf[1] 37-612. The 37-640 is a more reactive amine hardener consequently less is required to gel the epoxy.

[1] Trade name of Reichold Chemicals, Inc.

The equation used for calculating stoichiometry is as follows:

$$100 = X(37-140) + A(37-640) + 45(H_2O) + B(37-619) + .5(TiO_2)$$

$$X = (37-140) = \frac{A}{.6} + \frac{190}{55.6}B$$

TABLE 11

| | Solvent phase | | Resin phase | | | |
|---|---|---|---|---|---|---|
| Experiment # | H₂O | 37-640 | 37-640 | 37-140 | 37-619 | TiO₂ |
| 31 | 45 | 5 | 0 | 41.5 | 8.0 | .5 |
| 32 | 45 | 2.5 | 0 | 41.8 | 10.2 | .5 |
| 33 | 45 | 0 | 2.5 | 41.8 | 10.2 | .5 |
| 34 | 45 | 0 | 5 | 41.5 | 8.0 | .5 |

In experiments 32, 33 and 34 the emulsions broke into layers before formulation gelled.

TABLE 12

| Experiment # | Pore size, microns | Poor volume, percent |
|---|---|---|
| 31 | 15 | 38 |
| 32 | | |
| 33 | | |
| 34 | | |

EXAMPLE 35—POROUS SYNTACTIC FOAM

Improvements in mechanical properties or strength to weight ratios of the porous thermoset can be brought about by including low density fillers or reinforcing fibers. This is accomplished by adding these materials to either of the resin or hardener solutions described in example 6. It is believed that mechanical properties are enhanced more by adding reinforcing type fibers, such as milled glass fibers, to the resin phase, which has been referred to as the gelled phase. However, functional composites have been prepared using both approaches and also by adding these fillers after combining the two phases but before gellation.

A light weight syntactic foam, having a pore size of 19 microns and a bulk density of 26 pounds per cu. ft. was prepared by adding 10/20 mesh Celramic [4] nodules to the composition blend of example 6.

EXAMPLE 36—FIBER REINFORCED COMPOSITE

A fiber reinforced composite was prepared by adding 10% of chopped glass fiber strand ¼ inch (K832DB)[5] to the epoxy resin hardener solution of example 6. The preparation and cure after addition of chopped strand is identical with that of example 6. A fiber reinforced porous composition, having a pore size of 9 microns and a pore volume of 40%, resulted.

EXAMPLE 37—POROUS COMPOSITE LAMINATE

A pre-preg made by impregnating woven fiber glass or chopped strand mat was prepared using the resin mixture of example 6 and either reinforcing fabric. The chopped strand mat was ¾ oz. (M700)[5]. The fabric was a satin weave having a 10 to 11 mil thickness (marketed by J. P. Stevens). Tubes, flats and compound curvature porous structures were prepared. These ranged in pore size from 1 micron to 13 microns. The port volume ranged from 12% to 30%.

Very successful porous tools for vacuum molding and vacuum forming were made which contained elements of these laminates.

EXAMPLE 38—OPTIMIZED EPOXY FORMULATION

A "reversed emulsion" of water dispersed in a liquid epoxy resin was prepared from three separate solutions, designated below as "A," "B," and "C." The compositions of those solutions is given in Table 13, below.

TABLE 13

|  | Part A | Part B | Part C |
|---|---|---|---|
| CTBN—Elastomer | | | 2.7 |
| 37-140—Epoxy resin (see Example 6) | | | 52.1 |
| 37-619—Hardener (see Examples 19-12) | | 11.9 | |
| 37-640—Hardener (see Example 6) | 1.7 | 1.6 | |
| Water | 30.0 | | |
| Totals | 31.7 | 13.5 | 54.8 |

Preparation of Part A—The Non-Resin Phase 300 grams of distilled water and 17 grams of Epotuf [1] 37-619 were mixed at room temperature. The mixture was allowed to stand for twenty-four hours and then mixed well to form a solution.

Preparation of Part B—Hardener for Resin Phase 119 grams of Epotuf [1] 37-619 and 16 grams of Epotuf [1] 37-640 were mixed at room temperature. The mixture was next placed in an oven at 150° F. and heated at 120° F. When the mixture reached 120° F., it was cooled to room temperature with stirring.

---
[4] Trade name of Pittsburgh Corning Corporation.
[5] Trade name of Owens Corning Fiberglas.
[6] CTBN is the trade name of B. F. Goodrich Chemical Company for a carboxy-terminated acrylonitrile-butadiene co-polymer.

Preparation of Part C—The Resin 521 grams of bisphenol epoxy resin, Epotuf [1] 37-140 was thoroughly mixed with 27 grams of CTB [6] elastomer available from B. F. Goodrich Chemical Company. The mixture was placed in an oven at a temperature of 300° F. and heated to 260° F. The mixture was held at a temperature between 260° and 270° F. for 45 minutes (a time interval of at least 30 minutes and not longer than 60 minutes is required). While the mixture was at this temperature, it was occasionally stirred to keep the temperature uniform. At the end of the prescribed time interval, the mixture was cooled to room temperature.

Preparation of Porous Thermoset Plastic 548 grams of Part C and 135 grams of Part B were carefully mixed together to effect a solution of the monomeric resins. Careful mixing is required in order to minimize the entrainment of air in the solution mixture.

317 grams of Part A was then carefully dispersed in the 683 gram mixture of Parts B and C. The first part of this mixing operation was performed gently by hand until a stable, coarse dispersion of A in the B and C mixture was achieved. Next the dispersion was peptized by a more rapid hand stirring (the use of a mechanical stirrer is also acceptable). The dispersion had a uniform light cream color at the conclusion of the second mixing. If a shaped product were desired, the material could have been cast into an appropriate shaped mold at this point.

The material was allowed to cure at room temperature for at least twenty four hours. Following the cooling period the material was then cured at least two hours at 150° F.

The progress of the cure was monitored by viscosity measurements. The cure proceeded in the manner shown graphically in FIG. 2. Referring to FIG. 2, the initial curve represents polymerization of the continuous resin phase. The break, or discontinuity, in the graph indicates the point in time where the phase inversion started. The portion of the curve past the discontinuity follows the progress of the inversion process. In this instance the inversion was complete in 30 to 35 minutes.

The water in the coexistant continuous phase was then pushed out of the material using compressed air leaving a product having the following characteristics:

(1) pore volume 28.5%
(2) average pore diameter 33 microns
(3) hoop tensile strength 750 p.s.i.
(4) flexural strength 2850 p.s.i.

Figure 1:
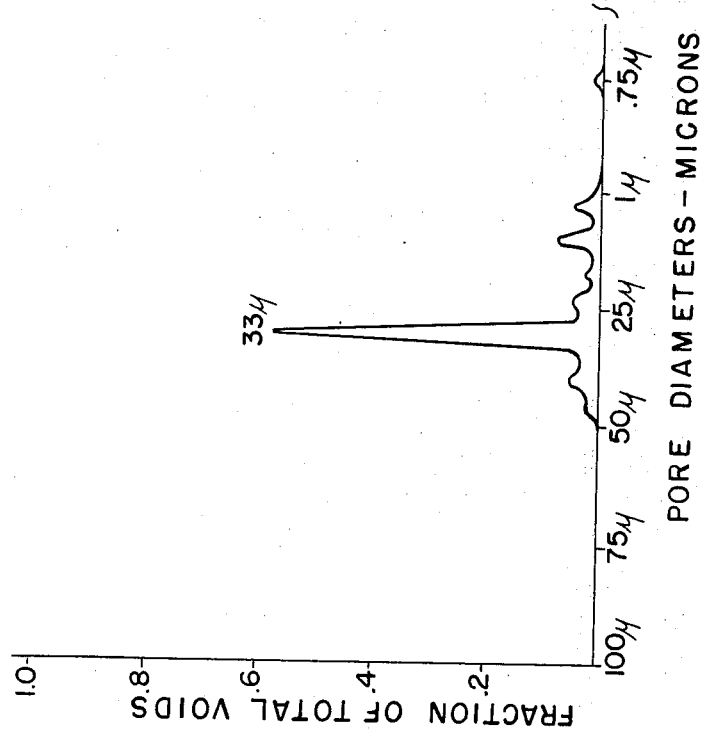
FIG. 1 is a graph showing the pore size distribution for the product of example 38.

The porous product had the pore size distribution shown graphically in FIG. 1.

A series of tests to determining water flux rates for this product at various thicknesses and pressures were conducted as shown in Table 14, below.

TABLE 14
Water flux (gal./day/sq. ft.)

| Pressure, p.s.i. | Thickness | | |
|---|---|---|---|
|  | 7.5 in. | 3.75 in. | 1.8 in. |
| 8 | 90 | 307 | 440 |
| 12 | 150 | 460 | 660 |
| 15 | 220 | 590 | 880 |
| 20 | 350 | 920 | 1,150 |
| 30 | 660 | 1,400 | 1,580 |

The above product represents the optimum formulation obtained as a result of several concurrent experiments. It exhibited the following optimum characteristics: (1) hoop tensile strength, (2) base porosity in the 30–40$\mu$ range, (3) minimal variations in hoop tensile stress at failure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. A method of preparing a porous thermosetting resin having an interconnected network of pores comprising the steps of:
 (a) preparing a blend of a liquid thermosetting resin and a first amount of hardener for said thermosetting resin wherein said first amount of hardener is less than the stoichiometric amount which is required to react with and cure the resin;
 (b) preparing a solution or suspension of a second amount of hardener in a second liquid, said second liquid being substantially a non-solvent with respect to said liquid resin, and said first and second amounts of hardener apportioned between said liquid resin and said second liquid to produce a phase inversion after partial gellation of said thermosetting resin;
 (c) mixing said blend with said solution or suspension to form an emulsion or dispersion wherein the thermosetting resin blend forms a continuous phase; and
 (d) gelling said emulsion or dispersion to produce a solid resin phase and a phase inversion of remaining liquids.

2. The method as set forth in claim 1 wherein said first amount of hardener and said second amount of hardener equal the total stoichiometric amount of hardener required for complete curing of the resin.

3. The method according to claim 2 which additionally includes postcuring said resin by heating at an elevated temperature sufficient to postcure the resin.

4. The method as set forth in claim 2 wherein said first amount of hardener present in said blend is between 0 and 95% of stoichiometry.

5. The method as set forth in claim 4 wherein the amount of hardener present in said second liquid is between 5% by weight and the stoichiometric amount.

6. The method of claim 1 additionally comprising removal of said second liquid subsequent to said phase inversion.

7. The method of claim 1 wherein said liquid resin is an epoxy resin and said hardener is an amine.

8. The method of claim 1 wherein said liquid resin comprises an epoxy resin and said hardener, added to said liquid resin in step A, comprises a first amine and wherein said hardener added to said second liquid in step B is a second amine, said second amine being an amine different from first amine.

9. The method of claim 1 wherein said liquid resin is an alkyd polyester and said hardener is methyl ethyl ketone peroxide.

10. The method of claim 1 wherein said liquid resin is a novalac resin solution and said hardener is hexamethylenetetramine.

11. The method of claim 1 wherein said liquid resin is a mixture of an epoxy resin and a novalac resin solution and wherein said hardener is a mixture of hexamethylenetetramine and a second amine, said second amine being an amine different from said first amine.

12. The method of claim 1 wherein the liquid resin is polyphenyl isocyanate and the hardener is glycerine, 13. The method of claim 1 wherein a monomer is additionally added to the resin blend of step A.

14. The method of claim 13 wherein said monomer is styrene.

15. The method of claim 1 wherein said second liquid of step B is water.

16. The method of claim 1 wherein said second liquid of step B is an alcohol.

17. The method of claim 1 wherein said emulsion or dispersion is applied to a pre-preg prior to gelation.

18. The method of claim 1 wherein a member selected from the group consisting of fillers and reinforcing fibers to added prior to gelation.

19. A method of preparing a solid porous epoxy resin comprising:
 (a) preparing a blend of a liquid epoxy resin, an elastomeric modifier, and a first amount of hardener for said epoxy resin wherein said first amount of hardener is less than the stiochiometric amount which is is required to react with and cure the resin;
 (b) preparing a solution or suspension of a second amount of hardener in a second liquid, said second liquid being substantially a non-solvent with respect to said liquid resin, and said first and second amounts of hardener apportioned between said liquid resin and said second liquid to produce a phase inversion after partial gellation of said thermosetting resin;
 (c) mixing said blend with said or suspension to form an emulsion or dispersion wherein the thermosetting resin blend forms a continuous phase; and
 (d) gelling said emulsion or dispersion to produce a solid resin phase and a phase inversion of remaining liquids.

20. The method of claim 19 wherein said first amount of hardener, added to said liquid resin in step A, comprises a first amine and wherein said second amount of hardener added to said second liquid in step B comprises a second amine, said second amine being an amine different from first amine.

21. The method of claim 19 wherein said elastomeric modifier is a carboxy-terminated butadiene-acrylonitrile copolymer.

References Cited

UNITED STATES PATENTS

| | | | |
|---|---|---|---|
| 3,450,650 | 6/1969 | Murata | 260—2.5 M |
| 3,655,591 | 4/1972 | Seiner | 260—2.5 M |
| 3,661,807 | 5/1972 | Seiner | 260—25 M |
| 3,654,193 | 4/1972 | Seiner | 260—2.5 M |
| 3,595,732 | 7/1971 | Tingerthal | 260—2.5 A Y |
| 3,565,982 | 2/1971 | Day | 260—2.5 A Y |
| 3,223,654 | 12/1965 | Wickerson | 260—2.5 E P |
| 3,320,187 | 5/1967 | Burt | 260—2.5 E P |
| Re. 27,444 | 7/1972 | Will | 260—2.5 N |
| 3,255,127 | 6/1966 | Von Bowin | 260—2.5 W |
| 3,244,772 | 4/1966 | Von Bowin | 260—2.5 W |

MORTON FOELAK, Primary Examiner

U.S. Cl. X.R.

117—126 GB, 126 GE; 210—500; 260—2.5 EP, 2.5 N, 2.5 F, 18 EP, 22 R, 29.2 EP, 29.3, 29.4 K, 29.6 NR, 37 EP, 38, 39 SB, 40 R, 41A, 41R, 41 AG, 41.5 R, 41.5 A

UNITED STATES PATENT OFFICE
CERTIFICATE OF CORRECTION

Patent No. 3,825,506                    Dated July 23, 1974

Inventor(s) Edward W. Carter

It is certified that error appears in the above-identified patent and that said Letters Patent are hereby corrected as shown below:

In column 13, line 5 (the equation), "X(37)-140)" should read --X(37-140)--;

in Table 7, under the heading "Experiment #", "23* **" should read --23* ***--.

In column 15, line 36, "port" should read --pore--.

In column 16, line 3, "$CTB^6$" should read --$CTBN^6$--.

claim 18, line 13, "to added" should read --is added--.

in claim 19, line 28, after "said", insert --solution--.

Signed and sealed this 5th day of November 1974.

(SEAL)
Attest:

McCOY M. GIBSON JR.                C. MARSHALL DANN
Attesting Officer                  Commissioner of Patents